United States Patent
Fletcher et al.

(10) Patent No.: US 9,499,140 B2
(45) Date of Patent: Nov. 22, 2016

(54) METHOD FOR REDUCING JERK WHEN COMPLETING AN AUTOMATIC BRAKING MANEUVER

(71) Applicant: Continental Automotive Systems, Inc., Auburn Hills, MI (US)

(72) Inventors: Graham Lanier Fletcher, North Augusta, SC (US); Andre Patrick Payant, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/603,468

(22) Filed: Jan. 23, 2015

(65) Prior Publication Data

US 2015/0210255 A1    Jul. 30, 2015

Related U.S. Application Data

(60) Provisional application No. 61/933,076, filed on Jan. 29, 2014.

(51) Int. Cl.
*B60T 7/22* (2006.01)
*B60T 8/17* (2006.01)

(52) U.S. Cl.
CPC .. *B60T 7/22* (2013.01); *B60T 8/17* (2013.01); *B60T 2201/022* (2013.01); *B60T 2230/04* (2013.01)

(58) Field of Classification Search
None
See application file for complete search history.

(56) References Cited

U.S. PATENT DOCUMENTS

| | | | | |
|---|---|---|---|---|
| 7,672,769 B2 * | 3/2010 | Braeuchle | .............. | B60T 7/22 701/70 |
| 8,660,767 B2 * | 2/2014 | Nakai | .............. | B60W 10/00 180/170 |
| 8,670,911 B2 * | 3/2014 | Fukuda | .............. | B60T 7/12 180/197 |
| 8,698,639 B2 * | 4/2014 | Fung | .............. | B60K 28/06 340/576 |
| 8,914,208 B2 * | 12/2014 | Maruyama | .............. | B60T 7/122 701/53 |
| 8,924,048 B2 * | 12/2014 | Smith | .............. | B60T 7/128 246/182 B |

(Continued)

FOREIGN PATENT DOCUMENTS

| | | | |
|---|---|---|---|
| EP | 0038956 A2 | 11/1981 | |
| EP | 0663327 A2 | 7/1995 | |

(Continued)

OTHER PUBLICATIONS

Search Report dated Jun. 29, 2015, from corresponding European Application No. 1515290.3.

(Continued)

*Primary Examiner* — Calvin Cheung
*Assistant Examiner* — Krishnan Ramesh

(57) ABSTRACT

An automatic braking system for a vehicle is disclosed that includes an electronic brake system capable of applying wheel brakes to decelerate the vehicle and a controller for actuating the brake system in a manner that reduces jerk at the termination of an automatic braking maneuver.

12 Claims, 2 Drawing Sheets

(56) References Cited

U.S. PATENT DOCUMENTS

| | | | | |
|---|---|---|---|---|
| 9,043,063 | B2* | 5/2015 | Jung | B60W 30/18109 180/197 |
| 9,248,811 | B2* | 2/2016 | Kato | B60T 7/22 |
| 9,358,962 | B2* | 6/2016 | Zambou | B60K 31/0008 |
| 2007/0096549 | A1* | 5/2007 | Reichle | B60G 17/0164 303/9.69 |
| 2007/0192009 | A1* | 8/2007 | Braeuchle | B60T 7/22 701/70 |
| 2009/0043474 | A1* | 2/2009 | Nakai | B60W 10/00 701/70 |
| 2009/0063001 | A1* | 3/2009 | Ueda | B60T 8/00 701/79 |
| 2011/0160974 | A1* | 6/2011 | Fukuda | B60T 7/12 701/70 |
| 2012/0197476 | A1* | 8/2012 | Smith | B60T 7/128 701/24 |
| 2012/0212353 | A1* | 8/2012 | Fung | B60K 28/06 340/905 |
| 2012/0239266 | A1* | 9/2012 | Kato et al. | 701/70 |
| 2013/0060433 | A1* | 3/2013 | Maruyama | B60T 7/122 701/53 |
| 2014/0188317 | A1* | 7/2014 | Jung | B60W 30/18109 701/22 |
| 2014/0277990 | A1* | 9/2014 | Zambou | B60K 31/0008 701/96 |

FOREIGN PATENT DOCUMENTS

| | | |
|---|---|---|
| JP | 2005112011 A | 4/2005 |
| JP | 2012148699 A | 8/2012 |
| WO | 0061412 A1 | 10/2000 |
| WO | 2005014350 A1 | 2/2005 |

OTHER PUBLICATIONS

Japanese Patent Office dated Feb. 1, 2016.

* cited by examiner

METHOD FOR REDUCING JERK WHEN COMPLETING AN AUTOMATIC BRAKING MANEUVER

CROSS REFERENCE TO RELATED APPLICATION

This application claims priority to U.S. Provisional Application No. 61/933,076 filed on Jan. 29, 2014.

TECHNICAL FIELD

The present disclosure relates to automotive vehicles, and more particularly to driver assistance systems for automotive vehicles.

BACKGROUND

Advancements in sensor technology have led to the ability to improve safety systems for vehicles. Arrangements and methods for detecting and avoiding collisions are becoming available. Such driver assistance systems use sensors located on the vehicle to detect an impending collision. The systems may warn the driver of various driving situations to prevent or minimize collisions. Such systems are especially useful for increasing safety in vehicles which operate under autonomous or semi-autonomous conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A disclosed automatic braking system for a vehicle includes an electronic brake system capable of applying wheel brakes to decelerate the vehicle and a controller for actuating the brake system in a manner that reduces jerk at the termination of an automatic braking maneuver.

The controller includes instructions for determining a braking maneuver based on an identified target stopping distance from a current location of a vehicle. To minimize jerk upon terminating the maneuver, the controller sends instructions to initially brake with a greater braking force than is necessary to stop at the target stopping distance, then sends commands to ramp the braking force back towards zero as the vehicle approaches the target stopping distance.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The present disclosure will become more fully understood from the detailed description and the accompanying drawings, wherein.

DETAILED DESCRIPTION

Figure 1:
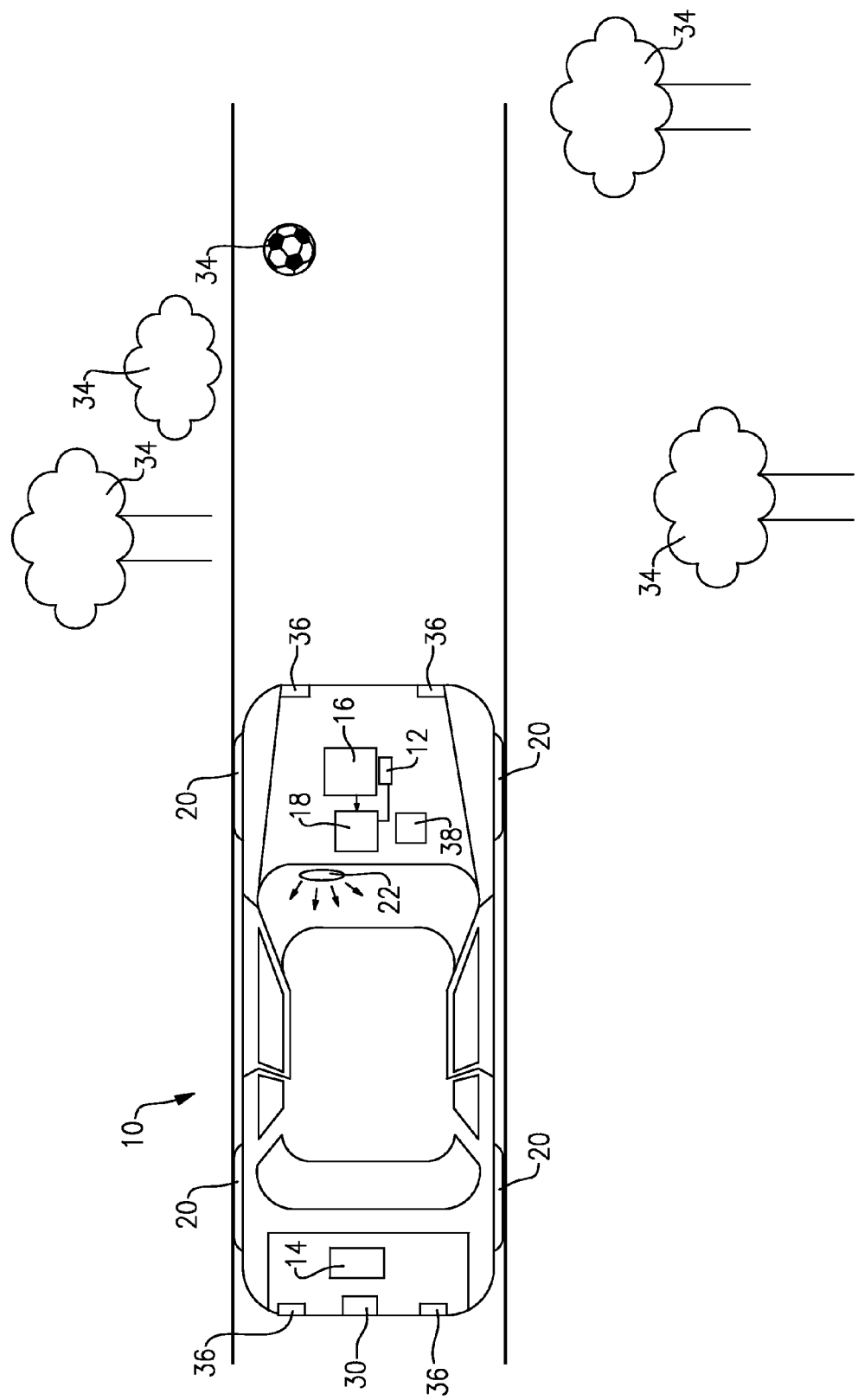
FIG. 1 is a schematic illustration of a top view of a vehicle utilizing a disclosed automatic braking system.

The following description is merely exemplary in nature and is in no way intended to limit the disclosure, its application, or uses. For purposes of clarity, the same reference numbers will be used in the drawings to identify similar elements.

Referring to FIG. 1, a vehicle 10 including an automatic braking system 12 is schematically shown. The automatic braking system 12 may be used to brake the vehicle 10 during autonomous and semi-autonomous vehicle operations. The automatic braking system 12 may also be used during a reverse driving maneuver. Throughout this specification the relative forward and reverse directions are in reference to the direction which an operator for the vehicle 10 would primarily be facing when operating the vehicle 10.

The automatic braking system 12 may be used along with other safety systems, such as a collision avoidance system 14 and an electronic brake system (EBS) 16. A common or separate controller 18 may be used by the systems 12, 14 and 16. The collision avoidance system 14 may also include a signal device 22 disposed within the vehicle cabin to alert an operator of a possible collision with surrounding objects 22.

In the disclosed example, the systems 12, 14, and 16 utilize information obtained from sensors disposed within the vehicle 10. In this example a camera 30 and proximity sensors 36 are provided that obtain information relating to objects 34 in the environment surrounding the vehicle 10. Moreover, the systems 12, 14 and 16 may obtain information form a global positioning system 38 provided in the vehicle 10. It should be understood that other methods and devices that provide information relating to the environment surrounding the vehicle could be utilized with the disclosed system and are within the contemplation of this disclosure.

The automatic braking system 12 determines when a braking event is required, the braking force required at each of the wheels 20 and whether the vehicle 10 is travelling in a forward or a reverse direction.

Braking maneuvers that significantly change deceleration over a short duration can result in a jerk or jolting of the vehicle that is neither comfortable nor desirable to occupants of a vehicle. Prediction and early intervention by an automatic braking system 12 enables more gradual braking along with a more controlled termination of a braking maneuver.

The automatic braking system 12 determines when a braking event needs to occur. The controller 18 may determine a velocity profile and the required braking force required when applying the brakes for the vehicle 10. The velocity profile is determined by an algorithm for the automatic braking system 12, which is separate from the EBS 16. The automatic braking system 12 utilizes the determined velocity profile to determine a ramp out braking force at the end of the automatic braking maneuver to gradually transition to a stop.

The algorithm and resulting ramp out of the braking force does not simply focus on the transition from kinetic to static friction. The method and system defines an actual velocity profile in such a way that the vehicle 10 smoothly transitions to a final braking deceleration close to zero, as the vehicle speed goes to zero.

The typical jerk associated with a transition of vehicle speed to zero is significantly reduced, or avoided, by the controller 18 planning ahead the desired braking force over the course of the braking maneuver. The automatic braking maneuver intentionally achieves the maximum braking force at a position short of the desired stopping location so that the braking force can be ramped out towards zero before the vehicle 10 comes to a stop at the desired location and time.

Figure 2:
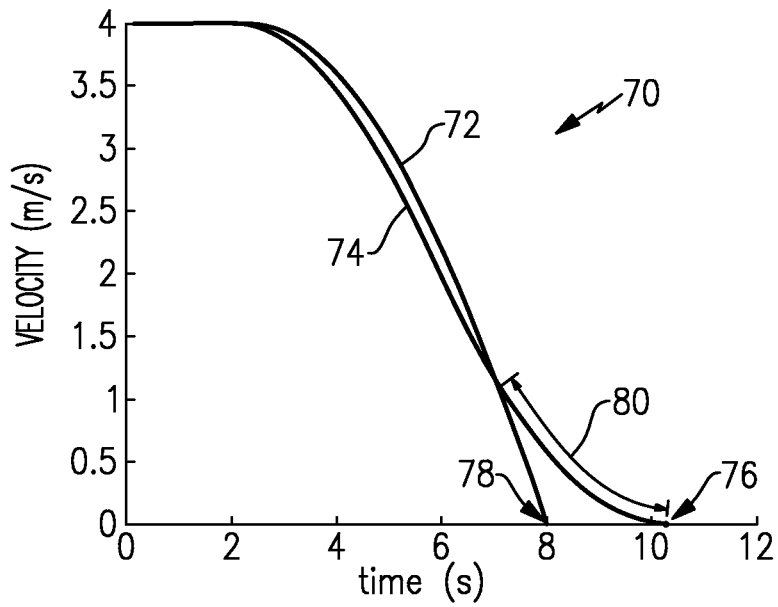
FIG. 2 is a graphical illustration of a velocity curve for terminating a braking maneuver in a manner that reduces jerk.

Referring to FIG. 2 with continued reference to FIG. 1, graph 70 illustrates vehicle deceleration curves over time. Upon detection of an object 34 or some other event or obstruction that requires the vehicle to stop at a defined point and time, the controller 18 determines a first braking maneuver that results in a first deceleration indicated by line 72 that provides for the vehicle 10 to stop at a target distance and time indicated at 78. However, such a stop could result in an undesired jerk or jolt.

Accordingly, the controller 18 determines a second braking maneuver 74 that has a deceleration which is initially greater than that of the maneuver indicated by line 72, but which ramps back towards zero before the vehicle reaches the desired stopping position at a second time indicated at 76.

Figure 3:
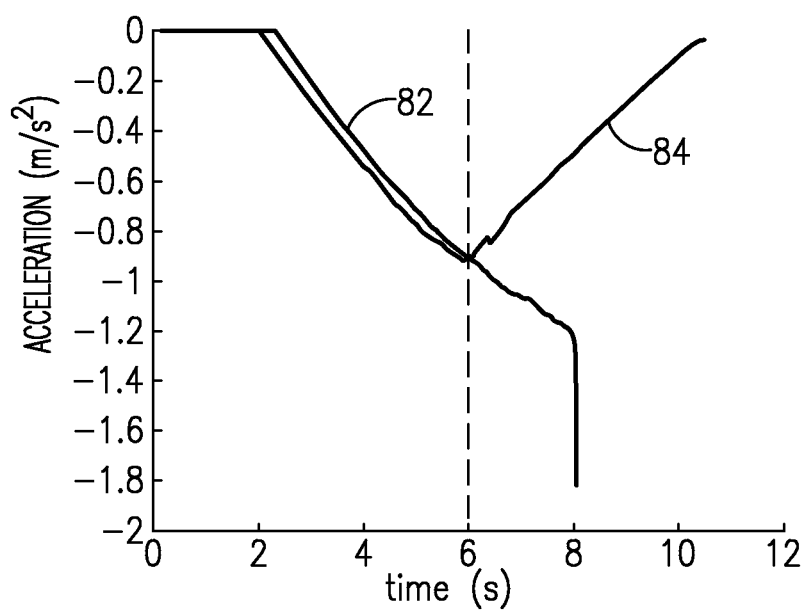
FIG. 3 is a graphical illustration of acceleration during a braking maneuver with reduced jerk.

Referring to FIG. 3 with continued reference to FIG. 2, at a predefined time, or distance, the controller 18 commands that the braking force be ramped back such that acceleration is changed from a first segment of increasing magnitude indicated at 82 to a second segment of decreasing magnitude indicated at 84 that moves toward zero to provide the gradual transition to zero velocity at the target stopping distance and time. The instantaneous change in deceleration upon reaching a velocity of zero is much smaller for the maneuver indicated by line 74 than that indicated by line 72. Accordingly, the example braking system 12 includes a gradual stop feature that reduces jerk as the vehicle comes to a substantially complete stop.

The transition between the first braking force and velocity profile to the second braking profile and velocity profile can be determined based on sensed conditions of the current vehicle movement. In one example, the transition is determined based on a distance from a predetermined stopping distance. The transition is therefore based on the predetermined distance to final stopping of the vehicle. This can be based on distance or time to the final stopping where the vehicle reaches a zero acceleration and velocity.

The transition may also be based on an acceptable amount of jerk at the final stopping point of the vehicle. The final amount of jerk acceptable is defined and the transition point determined such that the final stopping of the vehicle will result in a jerk within the defined range.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a velocity profile for a vehicle comprising:
    determining a first velocity profile with a controller based on an identified first target stopping distance from a current location of a vehicle;
    determining a second velocity profile with the controller required stop the vehicle at a second target stopping distance, wherein the second target stopping distance is less than the first target stopping distance;
    determining a first braking force to stop the vehicle at the second target stopping distance; and
    transitioning to a second braking force as the vehicle approaches the second target stopping distance determined to stop the vehicle at the first target stopping distance.

2. The method as recited in claim 1, wherein the first braking force is greater than the second braking force.

3. The method as recited in claim 1, including applying vehicle brakes with an automatic braking system to maneuver the vehicle according to at least one of the first velocity profile and the second velocity profile.

4. The method as recited in claim 1, wherein the transition from the first braking force to the second braking force is determined based on a distance from a predetermined stopping distance.

5. The method as recited in claim 1, wherein the transition from the first braking force to the second braking force is determined based on a predefined desired jerk.

6. The method as recited in claim 1, wherein the transition from the first braking force to the second braking force is determined based on a predefined velocity.

7. The method of claim 3, wherein applying the vehicle brakes with the automatic braking system further includes sending instructions to an electronic brake system to apply the vehicle brakes.

8. An automatic braking system for a vehicle comprising:
    an electronic brake system capable of applying wheel brakes to decelerate the vehicle; and
    a controller including instructions for:
    determining a first velocity profile based on an identified first target stopping distance from a current location of a vehicle;
    determining a second velocity profile required to stop the vehicle at a second target stopping distance, wherein the second target stopping distance is less than the first target stopping distance;
    determining a first braking force to stop the vehicle at the second target stopping distance; and
    transitioning the electronic brake system to a second braking force as the vehicle approaches the second target stopping distance determined to stop the vehicle at the first target stopping distance.

9. The automatic braking system for a vehicle as recited in claim 8, wherein the transition from the first velocity profile to the second velocity profile is determined based on a distance from a predetermined stopping distance.

10. The automatic braking system for a vehicle as recited in claim 8, wherein the transition from the first velocity profile to the second velocity profile is determined based on a predefined desired jerk.

11. The automatic braking system for a vehicle as recited in claim 8, wherein the transition from the first velocity profile to the second velocity profile is determined based on a predefined velocity.

12. The automatic braking system for a vehicle as recited in claim 8, wherein the controller includes instructions for applying vehicle brakes with an electronic brake system to decelerate the vehicle according to at least one of the first velocity profile and the second velocity profile.

* * * * *